United States Patent
Shi et al.

(10) Patent No.: US 11,925,146 B2
(45) Date of Patent: Mar. 12, 2024

(54) **CULTIVATION METHOD OF *MORCHELLA* WITHOUT NUTRIENT BAG**

(71) Applicant: Kunming Institute of Botany, Chinese Academy of Sciences, Kunming (CN)

(72) Inventors: Xiaofei Shi, Kunming (CN); Wei Liu, Kunming (CN); Yingli Cai, Kunming (CN); Fuqiang Yu, Kunming (CN)

(73) Assignee: Kunming Institute of Botany, Chinese Academy of Sciences, Kunming (CN)

( * ) Notice: Subject to any disclaimer, the term of this patent is extended or adjusted under 35 U.S.C. 154(b) by 97 days.

(21) Appl. No.: 17/704,843

(22) Filed: Mar. 25, 2022

(65) Prior Publication Data
US 2023/0055502 A1   Feb. 23, 2023

(30) Foreign Application Priority Data

Aug. 20, 2021   (CN) .......................... 202110958966.6

(51) Int. Cl.
*A01G 18/20*   (2018.01)
*A01G 18/40*   (2018.01)

(52) U.S. Cl.
CPC ............. *A01G 18/20* (2018.02); *A01G 18/40* (2018.02)

(58) Field of Classification Search
CPC ........ A01G 18/20; A01G 18/40; A01G 18/10; A01G 9/0299
See application file for complete search history.

(56) References Cited

U.S. PATENT DOCUMENTS

| 4,833,821 | A | * | 5/1989 | Tan | ......................... | A01G 18/30 47/1.1 |
| 4,918,859 | A | * | 4/1990 | Shevlin | .................. | A01G 18/60 47/1.1 |
| 4,987,698 | A | * | 1/1991 | Tan | ......................... | A01G 18/20 47/1.1 |

(Continued)

FOREIGN PATENT DOCUMENTS

CN   110089344 A   *   8/2019   ............. A01G 18/00

OTHER PUBLICATIONS

Google translation of CN 110089344A (Year: 2019).*

*Primary Examiner* — Monica L Perry
*Assistant Examiner* — Aaron M Rodziwicz
(74) *Attorney, Agent, or Firm* — Gregory D. DeGrazia; Miller, Canfield, Paddock and Stone PLC

(57) ABSTRACT

The present disclosure provides a cultivation method of morels and belongs to the technical field of cultivation of edible fungi. After nutrient contents that can be metabolized and utilized by morel mycelia are scientifically matched, sterilization treatment of exogenous nutrients is eliminated, and the exogenous nutrients are directly compressed for forming. Formed exogenous nutrient blocks and spawn is sowed and covered with soil, so as to realize a potential difference between "rich" and "poor" nutrients in a physical space. When the spawn germinate to form a mycelium network, the mycelia will enter a nutrient-rich exogenous nutrient area, secrete various extracellular enzymes to decompose and utilize these exogenous nutrient blocks, and transport them to a nutrient-poor mycelium network for storage, so as to complete nutrient assimilation and absorption, and reserve energy for later sexual reproduction.

9 Claims, 3 Drawing Sheets

(56) References Cited

U.S. PATENT DOCUMENTS

2007/0101642 A1\* 5/2007 Fang .................... A01G 18/70
                                                    47/1.1
2019/0359931 A1\* 11/2019 Mueller ................ A01G 18/20
2023/0047055 A1\* 2/2023 Chang .................. A01G 18/64

\* cited by examiner

CULTIVATION METHOD OF *MORCHELLA* WITHOUT NUTRIENT BAG

CROSS REFERENCE TO RELATED APPLICATION

This patent application claims the benefit and priority of Chinese Patent Application No. 202110958966.6 filed on Aug. 20, 2021, the disclosure of which is incorporated by reference herein in its entirety as part of the present application.

TECHNICAL FIELD

The present disclosure relates to the technical field of cultivation of edible fungi, and in particular to a cultivation method of *Morchella*.

BACKGROUND ART

The domestication and cultivation of *Morchella* mushroom in China has developed rapidly since its commercialization in 2012, with an increase of more than 50 times in 9 years. The cultivation areas are spread all over China.

The cultivation mode of *Morchella* is unique, the biggest difference of which from that of conventional edible fungi is that the morel mycelia grow in a soil medium to form a mycelium network, and then provide energy through nutrients of an exogenous nutrient bag for later fruiting. This "exogenous nutrient supplement" technology of morels is derived from the "exogenous nutrient" supplement program of R. D. Ower (1986). Ower pointed out that an external plastic bag can be loaded with paper scraps or rags supplemented with an urea solution and buckled on a fungi bed for mycelial absorption, and the plastic bag is removed for sexual multiplication induction before fruiting; or a jar containing organic matters suitable for metabolic utilization of *Morchella* used in the cultivation of spawn is turned upside down on the ridge surface and is directly in contact with the mycelia for transportation of nutrients to a mycelium network in soil for later fruiting. Nowadays, the use of exogenous nutrient bags in domestic cultivation of morels in China is similar to Ower's technical. The difference is that the container of the exogenous nutrient bag changes and the material formula in the bag changes. The entire operation process and use method are approximately the same.

The use of exogenous nutrient bags is an indispensable technical link for the cultivation of morels, and cultivation without exogenous nutrient bags cannot produce mushrooms. The cultivation technology for morels based on exogenous nutrient bags has problems such as trouble of making the exogenous nutrient bags and costly removal of the bags, which is not conducive to the efficient and green development of the morel industry.

SUMMARY

An objective of the present disclosure is to provide a cultivation method of morels. The cultivation method of the present disclosure gets rid of the limitation of exogenous nutrient bags and may significantly improve the utilization efficiency of exogenous nutrients for morels.

To achieve the above objective, the present disclosure provides the following technical solutions.

The present disclosure provides a cultivation method of morels, including the following steps:

Sowing morel spawn, applying formed exogenous nutrient blocks on the morel spawn, and covering the morel spawn and the exogenous nutrient blocks with soil, in which there is a gap between the exogenous nutrient blocks.

In some embodiments, the exogenous nutrient block is obtained by compression forming; and the exogenous nutrient block has a particle size of 2-5 cm.

In some embodiments, the exogenous nutrient block includes the following components in parts by weight: 40-45 parts of wheat, 30-35 parts of corn cob, 20-30 parts of straw, 3-5 parts of quicklime, 1-3 parts of gypsum, and 0.3-0.8 parts of potassium dihydrogen phosphate.

In some embodiments, the morel spawn is sowed at a rate of 100-250 kg/mu; a spacing between the adjacent exogenous nutrient blocks is 25-40 cm; and the exogenous nutrient blocks are applied at a rate of 400-600 kg/mu.

In some embodiments, the soil for covering has a thickness of 2-5 cm.

In some embodiments, after soil covering, the method further includes watering conducted within 24 h after the soil covering; and water for the watering saturates the soil at a depth of 15-20 cm.

In some embodiments, after the watering, the method further includes conducting fungus cultivation, mushroom induction, fruiting, and harvesting of a first crop of mushrooms; and the fungus cultivation is conducted at a soil humidity of 20-30% and a soil temperature of 4-18° C.

In some embodiments, the mushroom induction is conducted in the following conditions: ventilation and watering are conducted when a ground temperature rises to 5-7° C.; the ventilation is conducted 1-3 times a day for 0.5-2 h each time; and the watering is conducted 1-3 times in 1-2 days, and water for the watering makes surface soil at 15-25 cm soaked.

In some embodiments, the fruiting includes a stage with a mushroom height of 0-1 cm, a stage with a mushroom height of 1-5 cm, and a stage with a mushroom height of 5-13 cm;

culture at the stage with the mushroom height of 0-1 cm is conducted in the following conditions: a temperature of 6-12° C., an air humidity of 85-95%, a soil humidity of 25-30%, and a surface temperature of 4-15° C.; and when the fruiting is conducted indoors, ventilation is conducted 1-2 times a day for 25-35 min each time at a rate of 0.05-0.2 m/s;

culture at the stage with the mushroom height of 1-5 cm is conducted in the following conditions: an air humidity of 85-95%, a soil humidity of 25-30%, and a surface temperature of 6-18° C.; and when the fruiting is conducted indoors, ventilation may be conducted 2-3 times a day for 25-35 min each time at a rate of 0.05-0.3 m/s; and culture at the stage with the mushroom height of 5-13 cm is conducted in the following conditions: an air humidity of 85-95%, a soil humidity of 25-30%, and a surface temperature of 8-20° C.; and when the fruiting is conducted indoors, ventilation is conducted 2-4 times a day for 50-70 min each time at a rate of 0.05-0.3 m/s.

In some embodiments, after the first crop of mushrooms are harvested, the method further includes fungus cultivation, mushroom induction, fruiting, and harvesting for a second crop of mushrooms;

for the second crop of mushrooms, the fungus cultivation is conducted for 7-10 days; and the secondary fungus cultivation is conducted in the following conditions: a soil humidity of 15-20%, and a soil temperature of 2-6° C.; and for the second crop of mushrooms, the mushroom induction is conducted in the following conditions: a soil temperature of 5-12° C., a soil humidity of 25-30%, and an air humidity of 85-95%.

The present disclosure provides a cultivation method of morels. In the present disclosure, nutrient contents that can be metabolized and utilized by morel mycelia are formed. Formed exogenous nutrient blocks and spawn are sown and covered with soil, so as to realize a potential difference between "rich" and "poor" nutrients in a physical space. When the spawn germinates to form a mycelium network, the mycelia will enter a nutrient-rich exogenous nutrient area, secrete various extracellular enzymes to decompose and utilize these exogenous nutrient blocks, and transport them to a nutrient-poor mycelium network for storage, so as to complete nutrient assimilation and absorption, and reserve energy for later sexual reproduction. The cultivation method of the present disclosure is suitable for field cultivation and industrialized cultivation, minimizes the operations of making, sterilizing, transporting, perforating, placing, and removing an exogenous nutrient bag in conventional field cultivation of the morels, realizes all-around nutrient assimilation and absorption, and improves the fruiting area and production efficiency.

DETAILED DESCRIPTION OF THE EMBODIMENTS

Figure 1:
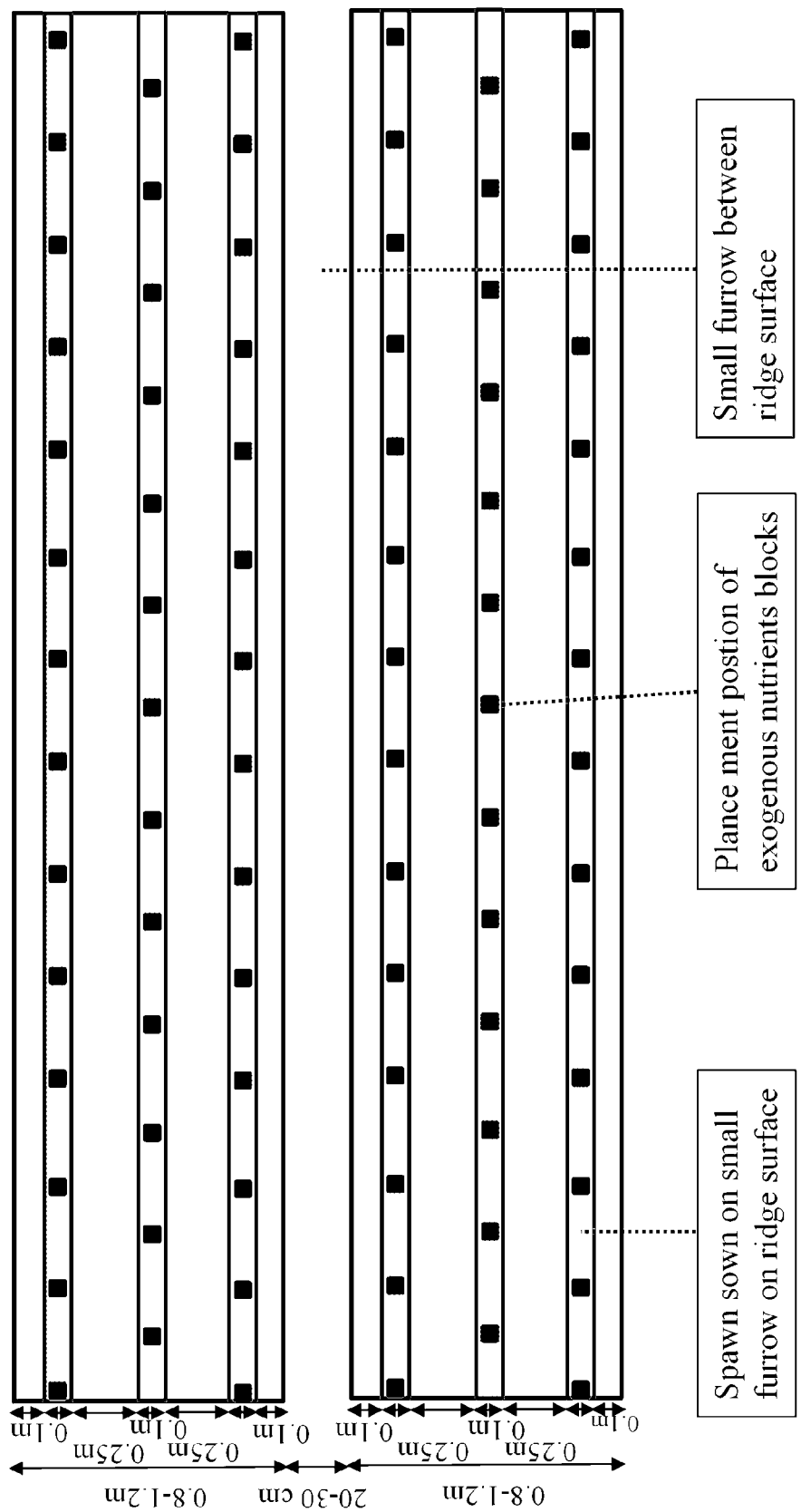
FIG. 1 is a schematic diagram of drilling.

The present disclosure provides a cultivation method of morels, including the following steps: sowing morel spawn, applying formed exogenous nutrient blocks on the spawn, and covering the morel spawn and the exogenous nutrient blocks with soil, in which there is a gap between the exogenous nutrient blocks.

In some embodiments of the present disclosure, the species of morels includes the *Elata* Clade strains. The *Elata* Clade strains in at least one embodiment include one or more of *Morchella importuna, M. sextelata, M. eximia*, Mel-21, and *M. capitata*. The above species of the morels are cultivated through the traditional exogenous nutrient bag feeding supplement cultivation technology to achieve fruiting.

In some embodiments of the present disclosure, the morel spawn is prepared by the following method.

S1, inoculating activated morels to a potato dextrose agar (PDA) medium for mother culture to obtain a maternal form, in which, the PDA medium includes the following components in 1 L: 200 g of potatoes, 20 g of glucose, 20 g of agar powder, and the balance of water; the potatoes are boiled to obtain juice, then mixed with glucose and agar powder, and supplemented with tap water to 1,000 mL, and a mixture is put into a 18*180 mm test tube, and sterilized and cooled for use. The mother culture is conducted at 18-23° C. for 7-10 days;

S2, inoculating the maternal form to a master stock medium for master stock culture to obtain a master stock, in which, the master stock medium includes the following components by mass percentage: 15-25% of wheat grains, 65-75% of sawdust, 10% of humus soil, 1.5% of quicklime, and 2% of gypsum; the wheat grains, the sawdust, the humus soil, the quicklime, and the gypsum are mixed, and then bottled and sterilized to obtain the master stock medium; the master stock medium has a water content of 60-65%;

the master stock culture is conducted at 18-21° C. for 15-20 days;

S3, inoculating the master stock to a spawn medium for spawn culture to obtain a cultivated spawn, in which, the spawn medium includes the following components by mass percentage: 30-50% of wheat grains, 20-30% of sawdust, 10-20% of chaff, 10-20% of corn cob, 10% of humus soil, 1.5% of quicklime, and 2% of gypsum; the wheat grains, the sawdust, the chaff, the corn cob, the humus soil, the quicklime, and the gypsum are mixed, and are bagged and sterilized to obtain the cultivated spawn; the spawn medium has a water content of 60-65%;

the spawn culture is conducted at 18-21° C. for 15-20 days.

In the present disclosure, the method further includes construction of a shed and land preparation in the shed before the sowing. In the present disclosure, the shed includes a plastic hoop house, a flattop shed or a greenhouse. The shed in one or more embodiments is a shed that can resist wind and snow. The shed adopts a black shading net for shading and light avoidance. The black shading net has a shading rate ≥85%. In accordance with some embodiments, an intelligent mushroom house with adjustable temperature, light and humidity is used for industrialized indoor cultivation.

In some embodiments of the present disclosure, land preparation in the shed includes arranging the land in the shed into ridge surfaces with a width of 0.8-1.2 m, and in some embodiments 1 m. A furrow width between the ridge surfaces in one or more embodiments is 0-0.3 m, and in some embodiments 0.1-0.2 m. The furrow depth between the ridge surfaces is determined according to the water potential. In some embodiments, the furrow depth between the ridge surfaces in Northern China with shallower water levels is 0-0.15 m, and in some embodiments 0.05-0.1 m. In some embodiments, the furrow depth between the ridge surfaces in rainy Southern china is 0.2-0.3 m, and in some embodiments 0.25 m. In the present disclosure, the exogenous nutrient block forms a high-nutrient potential energy space on the ridge surface, facilitating the mycelia on other parts of the ridge surface to absorb and assimilate nutrients.

In some embodiments of the present disclosure, the industrialized indoor cultivation of the morel spawn is conducted on a shelf or a frame. A soil layer in at least one embodiment has a thickness of 8-15 cm. Soil for the industrialized indoor cultivation in one or more embodiments is soil with good air permeability.

In the present disclosure, a sowing method for the morel spawn includes furrow sowing and/or broadcast sowing. In some embodiments of the present disclosure, the furrow sowing includes furrowing and sowing on the ridge surface along the ridge. In at least one embodiment, a furrow has a depth of 10-15 cm, and in some embodiments 12 cm. In some embodiments, a furrow spacing is 20-30 cm, and in some embodiments 25 cm. The sowing method in one or more embodiments includes broadcasting the morel spawn. In at least one embodiment, the morel spawn is broadcast at a rate of 100-250 kg/mu, and in some embodiments 200 kg/mu. In the present disclosure, the broadcast sowing includes broadcasting the morel spawn on the ridge surface.

In some embodiments of the present disclosure, raw materials of the exogenous nutrient block include crop waste, starch substances, and auxiliary material components. The morel metabolizes and utilizes the raw materials selected for the exogenous nutrient block and is supplemented with required mineral elements through auxiliary materials. In the present disclosure, the starch substances include one or more of wheat, barley, rice, corn, and sorghum. The starch substances are the main metabolic nutrients for morels. In at least one embodiment, the starch substances are crushed, the crushed starch substances facilitates rapid absorption of the starch substances by morel mycelia. In the present disclosure, the crop waste includes one or more of corn cob, corn straws, sawdust, chaff, cottonseed hulls, and fungus residues. Cellulose, hemicellulose, lignin, and soluble small molecular substances in the crop waste are substances that are easily metabolized and absorbed by morels. The crop waste in one or more embodiments is fermented. The fermented crop waste has excellent physical and chemical properties such as moisture and air permeability. In addition, in the fermentation process, thermophilic microorganisms metabolize macromolecular substances to facilitate the rapid absorption of the morel mycelia. In the present disclosure, the auxiliary material components include one or more of quicklime, gypsum, and potassium dihydrogen phosphate. The auxiliary material components are used to buffer acidic substances secreted during the growth of morel mycelia and supplement calcium ions, potassium ions, and phosphate ions needed by morels.

In some embodiments of the present disclosure, the exogenous nutrient block includes the following components in parts by weight: 40-45 parts of wheat, 30-35 parts of corn cob, 20-30 parts of straw, 3-5 parts of quicklime, 1-3 parts of gypsum, and 0.3-0.8 parts of potassium dihydrogen phosphate, and more in some embodiments, the exogenous nutrient block includes the following components in parts by weight: 42 parts of wheat, 32 parts of corn cob, 25 parts of straw, 4 parts of quicklime, 2 parts of gypsum, and 0.5 parts of potassium dihydrogen phosphate. In some embodiments of the present disclosure, the wheat has a water content of 10-14%. In one or more embodiments, the wheat is crushed, and has a particle size of 0.2-0.3 cm. The corn cob is crushed to a particle size of 0.3-0.8 cm. After compression forming, the exogenous nutrient block in one or more embodiments has a particle size of 2-5 cm.

In the present disclosure, a preparation method for the exogenous nutrient block is as follows: mixing wheat, corn cob, straw, quicklime, gypsum, and potassium dihydrogen phosphate to obtain a mixture, and conducting compression forming on the mixture to obtain the exogenous nutrient block.

Before the compression forming, the method according to some embodiments further includes crushing the mixture and conducting compression forming on the crushed material.

In some embodiments of the present disclosure, the compression forming is conducted at a compression ratio of (3.5-4.5):1, and in some embodiments 4:1.

In the present disclosure, the raw materials of the exogenous nutrient block are all dry matter raw materials. There is no need to sterilize the exogenous nutrient block during preparation and before use. 3-5 parts of the quicklime are provided, and the purpose is that the quicklime has a certain binding effect, which can ensure forming and the stability of forming. The strong alkalinity of the quicklime also has an antibacterial effect to ensure that the compressed material will not be invaded by miscellaneous bacteria for a period of time after use. The alkaline effect of the quicklime can also neutralize organic acids secreted during the growth of the morels, which will promote the healthy growth.

In the present disclosure, the exogenous nutrient block is obtained by compression forming. In at least one embodiment, the exogenous nutrient block has a particle size of 2-5 cm, and the compression forming in one or more embodiments is thermoforming. After the exogenous nutrient block is compressed and formed, it is convenient for packaging, transportation and mechanized feeding operations during large-scale production, which facilitates formation of a physical space spacing. In the present disclosure, the shape of the exogenous nutrient block is not particularly limited. During specific implementation of the present disclosure, the exogenous nutrient block in one or more embodiments is of a rectangular shape, a cubic shape, a spherical shape, a cylindrical shape, an ellipsoidal shape, or an irregular shape.

In the present disclosure, the exogenous nutrients are suitable for field cultivation, frame cultivation, shelf cultivation, and industrialized cultivation. The exogenous nutrients and the spawn is applied and released together, and then watered. The exogenous nutrient block gradually expands after absorbing water, and the spawn germinates to form a mycelium network, grow into the exogenous nutrient block, and absorb nutrients from the exogenous nutrient block and store it in the mycelium network and *sclerotium* cells, so as to reserve energy for later fruiting.

The method of the present disclosure is suitable for the cultivation of various species of morels and is especially suitable for saprophytic species of morels. The exogenous nutrient block of the present disclosure provides nutrients and meets the needs of later reproductive growth of the morels.

Figure 2:
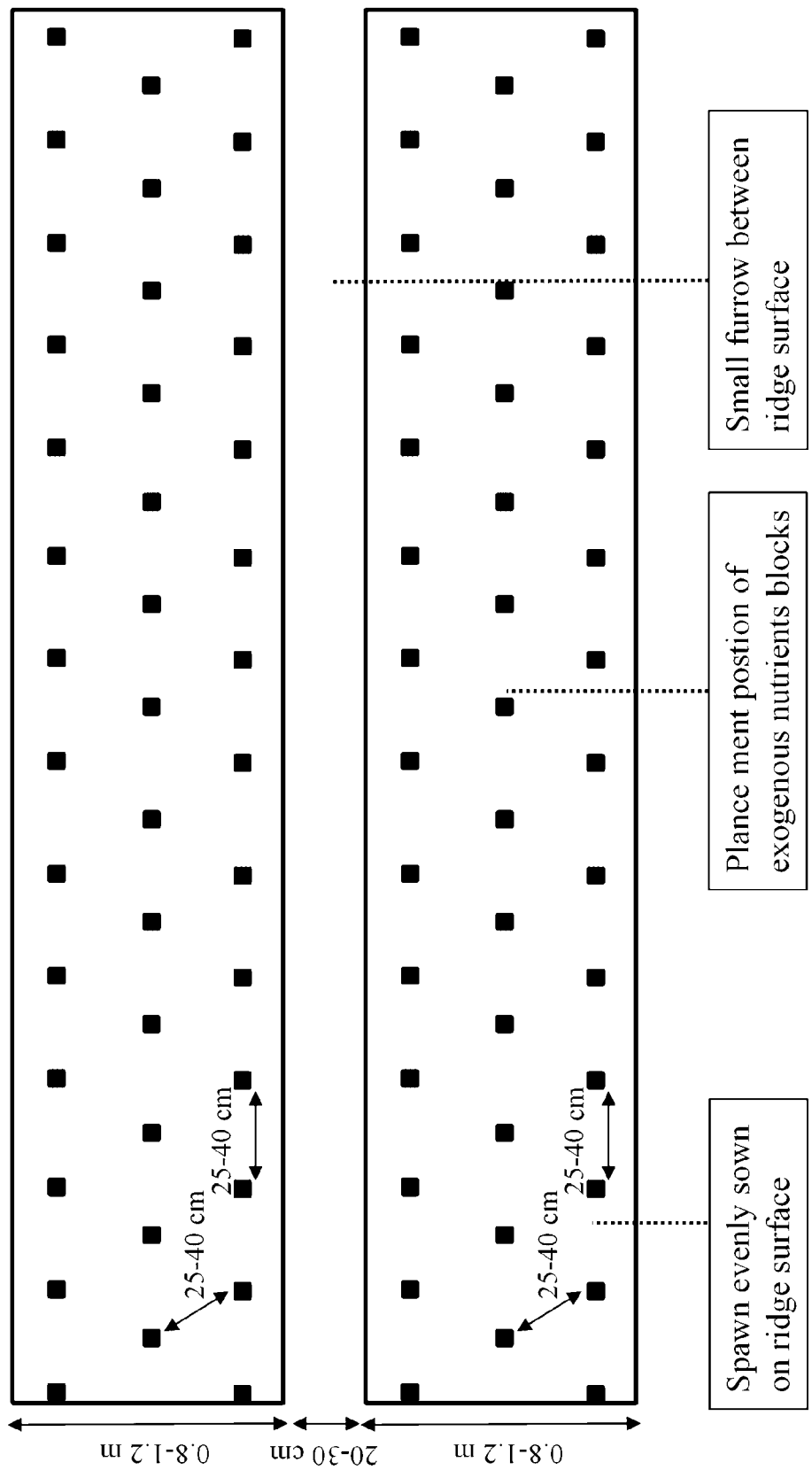
FIG. 2 is a schematic diagram of broadcast sowing.
Figure 3:
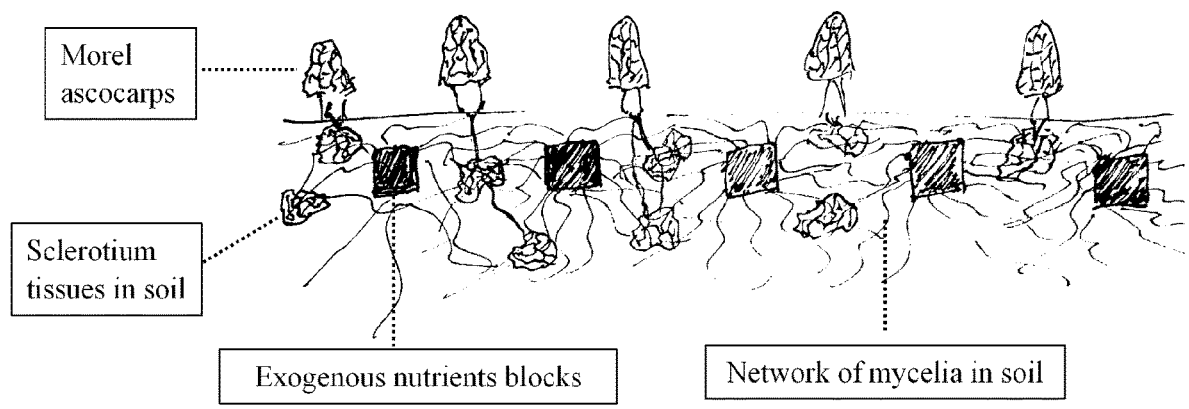
FIG. 3 is a schematic cross-sectional view of exogenous nutrient blocks and a mycelium network.

In some embodiments of the present disclosure, a spacing between the adjacent exogenous nutrient blocks is 25-40 cm, and in some embodiments is 30-35 cm. In one or more embodiments, the exogenous nutrient blocks are applied at a rate of 400-600 kg/mu. When the sowing method for the morel spawn is furrow sowing, the exogenous nutrient blocks are dibbled on the spawn in the furrow, and a hole spacing of the exogenous nutrient blocks dibbled in one or more embodiments is 25-40 cm, and in some other embodiments 30-35 cm, as shown in the schematic diagram of FIG. 1. When the sowing method for the morel spawn is broadcast sowing, the exogenous nutrient blocks are dibbled in a plum blossom shape, and in one or more embodiments, a hole spacing of the exogenous nutrient blocks dibbled is 25-40 cm, and 30-35 cm in some embodiments, as shown in the schematic diagram of FIG. 2.

After the exogenous nutrient blocks are applied, soil covering is conducted, and the soil for covering has a thickness of 2-5 cm. The soil for covering in one or more embodiments is furrow soil between the ridge surfaces. In the present disclosure, after the soil covering, the morel mycelia grow in the soil. The soil covering is conducted to cover the exogenous nutrient block, avoid the invasion of miscellaneous bacteria, and create an absolute physical barrier, which facilitates the formation of the mycelium network and the absorption and transformation of nutrients, forming a large amount of *sclerotium* tissues at the same time.

After the soil covering, the method in accordance with some embodiments of the present disclosure includes watering. In the present disclosure, there are no special limitations on a watering method. In the present disclosure, the watering in one or more embodiments is conducted within 24 h after the soil covering. Water for the watering saturates the soil at a depth of 15-20 cm. The watering is conducted to make the soil, spawn, and the exogenous nutrient block absorb water, such that the mycelia grow rapidly in a humid environment.

After the watering, the method in accordance of the embodiments of the present disclosure further includes film mulching. In the present disclosure, when the soil for cultivation is sandy soil or the moisturizing effect of the shed is not good, the film mulching is conducted. In some embodiments the film mulching is conducted on the 2nd to 5th days after the watering. In some embodiments the film mulching uses a black or white agricultural mulch film. The mulch film covers the ridge surface, and soil is pressed every 1-3 m on both sides of the mulch film.

After the watering, the method according to some embodiments of the present disclosure further includes conducting fungus cultivation, mushroom induction, fruiting, and harvesting of a first crop of mushrooms in sequence.

In some embodiments of the present disclosure, the fungus cultivation is conducted at a soil humidity of 20-30%, and in some embodiments 23-25%, and a soil temperature of 4-18° C., in some embodiments 5-15° C., and in some other embodiments 10° C. In one or more embodiments of the process of fungus cultivation, the field cultivation uses a shading net with a shading rate of 85-95%, and the indoor cultivation uses a full-spectrum light source with a light intensity of 500-3,000 lx, and in some embodiments 1,500-2,000 lx.

In the present disclosure, the mushroom induction is conducted in the following conditions: ventilation and watering are conducted when a ground temperature rises to 5-7° C., and if the film mulching is conducted at an early stage, the mulch film is removed at this time. When the mushroom induction is conducted indoors, the ventilation is conducted 1-3 times a day, and in some embodiments 2 times a day, for 0.5-2 h each time. The watering is conducted 1-3 times in 1-2 days for water stimulation, and water for the watering makes surface soil at 15-25 cm soaked. The mushroom induction is conducted in the following light conditions: the field cultivation is subject to daily light changes, and the light intensity ≥1,000 lx; and the indoor cultivation of one or more embodiments is conducted under light for 12 h and darkness for 12 h, and the light intensity is 1,500-2,500 lx, and in some embodiments 2,000 lx. The mushroom induction conditions of the present disclosure induces the transformation of the morels from vegetative growth to reproductive growth.

In at least one embodiment of the present disclosure, the fruiting includes a stage with a mushroom height of 0-1 cm, a stage with a mushroom height of 1-5 cm, and a stage with a mushroom height of 5-13 cm.

In the present disclosure, the stage with the mushroom height of 0-1 cm is a primordium generation stage. In the primordium generation process, mechanical damage caused by watering is avoided. If the humidity is not enough, spray watering is preferred, which can be done in small quantities for multiple times, and a single water volume should be less rather than more. In some embodiments culture at the stage with the mushroom height of 0-1 cm is conducted in the following conditions: a temperature of 6-12° C., an air humidity of 85-95%, a soil humidity of 25-30%, and a surface temperature of 4-15° C. In at least one embodiment, when the fruiting is conducted indoors, ventilation is conducted 1-2 times a day for 25-35 min each time, and in some embodiments 30 min, at a rate of 0.05-0.2 m/s, and in some embodiments 0.1-0.15 m/s. In at least one embodiment, the light intensity at the stage with the mushroom height of 0-1 cm is 1,000-2,000 lx, and in some embodiments 1,500 lx, with light for 12 h and darkness for 12 h. The temperature, humidity, and light intensity are milder in the primordium generation process, which can improve the survival rate of the primordium.

In the present disclosure, the stage with the mushroom height of 1-5 cm is a small mushroom culture stage. In some embodiments, culture at the stage with the mushroom height of 1-5 cm is conducted in the following conditions: an air humidity of 85-95%, a soil humidity of 25-30%, and a surface temperature of 6-18° C., and the surface temperature set to 6-18° C. accelerates the growth of mushrooms. In some embodiments, when the fruiting is conducted indoors, ventilation is conducted 2-3 times a day for 25-35 min each time, and in some embodiments 30 min, at a rate of 0.05-0.3 m/s, in some embodiments 0.1-0.25 m/s, and in some other embodiments 0.15-0.2 m/s.

In the present disclosure, the stage with the mushroom height of 5-13 cm is a rapid growth stage of mushrooms. In some embodiments, culture at the stage with the mushroom height of 5-13 cm is conducted in the following conditions: an air humidity of 85-95%, a soil humidity of 25-30%, and a surface temperature of 8-20° C., and the surface temperature set to 8-20° C. accelerates the growth of mushrooms. In some embodiments, when the fruiting is conducted indoors, ventilation is conducted 2-4 times a day, and in some embodiments 3 times, for 50-70 min each time, and in some embodiments 60 min, at a rate of 0.05-0.3 m/s, in some embodiments 0.1-0.25 m/s, and in some other embodiments 0.15-0.2 m/s. The ventilation is conducted to accelerate the growth of young mushrooms.

In the present disclosure, after the first crop of mushrooms is harvested, the method further includes fungus cultivation, mushroom induction, fruiting, and harvesting for a second crop of mushrooms. For the second crop of mushrooms of one or more embodiments, the fungus cultivation is conducted for 7-10 days. In some embodiments the secondary fungus cultivation is conducted in the following conditions: a soil humidity of 15-20%, and a soil temperature of 2-6° C. For the second crop of mushrooms of one or more embodiments, the mushroom induction is conducted in the following conditions: a soil temperature of 5-12° C., a soil humidity of 25-30%, and an air humidity of 85-95%. The conditions for mushroom induction and harvesting of the second crop of mushrooms are the same as those of the first crop of mushrooms.

In some embodiments of the present disclosure, the harvest criteria of the first crop of mushrooms and the second crop of mushrooms are respectively that the ridges and pits of the morels are cracked, and the ridges and furrows are distinct. For the harvesting, a knife in one or more embodiments is used to cut the morels along the flush roots. After the harvesting, the method according to some embodiments further includes removing soil or debris carried on the feet of the morels for later fresh sale or drying.

In the present disclosure, after the cultivation of the morels is completed, the shed can be removed, and the land can be plowed to be used for subsequent planting of other crops.

The technical solutions in the present disclosure will be clearly and completely described below in conjunction with examples of the present disclosure. It is clear that the described examples are merely a part, rather than all of the embodiments of the present disclosure. All other embodiments obtained by those ordinary skill in the art on the basis of the examples of the present disclosure without creative efforts shall fall within the protection scope of the present disclosure.

Example 1

From 2019 to 2020, the *Morchella importuna* was planted in Huangpi District, Wuhan City, Hubei Province.

1. Production of spawn: a three-level strain production scheme was used for the production of the trains, which were divided into maternal form, master stock, and cultivated spawn.

Production of the maternal form: a PDA (200 g of potato boiled for juice, 20 g of glucose, 20 g of agar powder, and tap water for supplementation to 1,000 mL; put into a 18*180 mm test tube, and sterilized and cooled for use) medium was selected, inoculated with activated high-quality spawn, and cultured at 18° C. for 7 days for use.

Production of the master stock: 15 g of wheat grains, 65 g of sawdust, and 10 g of humus soil were selected as main raw materials and supplemented by 1.5 g of lime and 2 g of gypsum and were bottled (650-1,000 mL bottle) and sterilized, and then inoculated with activated maternal form and cultured at 18° C. for 15 days for use.

Production of the cultivated spawn: 30 g of wheat grains, 20 g of sawdust, 10 g of chaff, 10 g of corn cob, and 10 g of humus soil were selected as main raw materials and supplemented by 1.5 g of lime and 2 g of gypsum, and were bagged and sterilized, and then inoculated with high-quality master stock, and cultured at 18° C. for 15 days for use.

2. Shed treatment: a shed was constructed in accordance with the terrain and climate of the day, and a plastic hoop house was selected, which was resistant to wind and snow. The shed used a black shading net with a shading rate of more than 85% for shading and light avoidance.

3. Land preparation: According to the terrain, the field was arranged into ridge surfaces with a width of 0.8 m. The furrow width between the ridge surfaces was 0.1 m. The furrow depth was 0.15 m.

4. Selection and treatment of exogenous nutrient blocks:

Wheat: high-quality wheat with no moth, no mildew, and a water content of 10-14% was selected and crushed to a size of 0.2-0.3 cm.

Corn cob: corn cobs with no mildew and a water content of 10-15% was crushed to a particle size of 0.3-0.8 cm.

Auxiliary materials: quicklime, gypsum, and potassium dihydrogen phosphate.

Formula: 40 kg of wheat, 30 kg of corn cob, 20 kg of corn straw, 3 kg of quicklime, 2 kg of gypsum, and 0.5 kg of potassium dihydrogen phosphate. According to the above formula, the raw materials were mixed thoroughly and compressed into a cylinder with a forming particle size of 2 cm.

5. Sowing and feeding:

Furrow sowing: mechanical furrow sowing or artificial furrow sowing was conducted on the ridge surface, and furrowing was performed along the ridge. The furrow depth was 10 cm and the furrow spacing was 20 cm. After a bag was broken and the high-quality spawn were crushed, the high-quality spawn was broadcast according to the usage amount of 150 kg/mu. Then, the prepared exogenous nutrient blocks were "dibbled" on the spawn in the small furrow, and a hole spacing of the exogenous nutrient blocks "dibbled" was 25-40 cm, as shown in the schematic diagram of FIG. 1. 400 kg of the exogenous nutrients was used per mu. After that, the small furrow was leveled to ensure that the spawn and the exogenous nutrient blocks were covered with soil with a thickness of 2-5 cm.

A layout diagram after sowing is shown in Annex 3.

6. Watering:

After the soil covering, a watering operation was completed within 24 h, and the water volume was controlled to saturate the soil on the ridge surface at a depth of 15-20 cm.

7. Film mulching:

On the 2nd day after the watering, the film mulching was conducted. Specific operation: a black agricultural mulch film was selected according to the width of the ridge surface, and covered the ridge surface, and soil was pressed every 1-3 m on both sides of the mulch film.

8. Fungus cultivation stage:

In the fungus cultivation stage, it was ensured that soil humidity was about 23% and a soil temperature was 4° C.

9. Mushroom induction:

The mushroom induction was conducted when a ground temperature rose to 5-7° C., the mulch film was removed, and the shed was ventilated 1-3 times a day for 0.5-2 h each time. Watering was conducted 1-3 times in 1-2 days for water stimulation, and water made the surface soil at 15-25 cm soaked.

10. Fruiting management:

The primordium occurred at the low temperature of 6-8° C. After the primordia formation, the air humidity was kept at 85-95% and the soil humidity at 25-30% to avoid mechanical damage to the primordium during watering. The surface temperature was kept above 4° C., but not over 15° C. The shed was ventilated 1-2 times a day for 30 min each time at a rate of 0.05-0.2 m/s. In a small mushroom stage, the soil humidity and the air humidity were kept unchanged, the surface temperature used to be as high as 6-18° C., and ventilation was conducted 2-3 times a day for 30 min each time at a rate of 0.05-0.3 m/s to accelerate the growth of young mushrooms. In a rapid growth stage of mushrooms, the air humidity and the soil humidity were constant, the surface temperature was 8-20° C., and ventilation was conducted 2-4 times a day for 1 h each time at a rate of 0.05-0.3 m/s until the mushrooms mature.

11. Mushroom induction and management of second crop of mushrooms:

After the first crop of mushrooms were harvested, the temperature of the shed was controlled to reduce to 5-12° C., the soil humidity was adjusted to 25-30%, ventilation was reduced, and mushroom induction stimulation was conducted on the second crop of mushrooms as the mushroom induction operation described above. After the primordium occured, fruiting management was conducted as described above.

12. Harvesting:

A clean knife was used to cut the mushrooms along the flush roots. Soil or debris carried on the feet of the mushrooms was removed for later fresh sale or drying.

13. End of production:

After the production was completed, the shed was removed and the land was plowed to be used for subsequent planting of crops.

The output per unit square was 600 g.

Example 2

From 2019 to 2020, the *Morchella sextelata* was planted in Zhaohua District, Guangyuan City, Sichuan Province.

1. Production of spawn: a three-level strain production scheme was used for the production of the trains, which were divided into maternal form, master stock, and cultivated spawn.

Production of the maternal form: a PDA (200 g of potato boiled for juice, 20 g of glucose, 20 g of agar powder, and tap water for supplementation to 1,000 mL; put into a 18*180 mm test tube, and sterilized and cooled for use) medium was selected, inoculated with activated high-quality spawn, and cultured at 23° C. for 10 days for use.

Production of the master stock: 25 g of wheat grains, 75 g of sawdust, 10 g of humus soil, 1.5 g of lime, and 2 g of gypsum were selected, and were bottled (650-1,000 mL bottle) and sterilized, and then inoculated with activated mother seeds and cultured at 21° C. for 20 days for use.

Production of the cultivated spawn: 50 g of wheat grains, 30 g of sawdust, 20 g of chaff, 20 g of corn cob, 10 g of humus soil, 1.5 g of lime, and 2 g of gypsum were selected, and were bagged and sterilized, and then inoculated with high-quality original seeds, and cultured at 21° C. for 20 days for use.

2. Shed treatment: a shed was constructed in accordance with the terrain and climate of the day, a greenhouse was selected, which was resistant to wind and snow. The shed used a black shading net with a shading rate of more than 85% for shading and light avoidance.

3. Land preparation: According to the trend of the field, the field was arranged into ridge surfaces with a width of 1.2 m. The furrow width between the ridge surfaces was 0.3 m. The furrow depth was 0.3 m.

4. Selection and treatment of exogenous nutrient blocks:

Wheat: high-quality wheat with no moth and no mildew and a water content of 10-14% was selected and crushed to a size of 0.2-0.3 cm.

Corn cob: corn cobs with no mildew and a water content of 10-15% was crushed to a particle size of 0.3-0.8 cm.

Auxiliary materials: quicklime, gypsum, and potassium dihydrogen phosphate.

Formula: 45 kg of wheat, 35 kg of corn cob, 30 kg of wheat straw, 5 kg of quicklime, 2 kg of gypsum, and 0.5 kg of potassium dihydrogen phosphate. According to the above formula, the raw materials were mixed thoroughly and compressed into a square shape with a forming particle size of 5 cm.

5. Sowing and feeding:

Broadcast sowing of spawn: the spawn was broadcast evenly on the flat ridge surface according to the usage amount of 150-250 kg/mu. Then on the ridge surface, the exogenous nutrient blocks were "dibbled" and released in a plum blossom shape. A hole spacing of the exogenous nutrient blocks "dibbled" was 25-40 cm, as shown in the schematic diagram of FIG. 2. The amount of exogenous nutrients used per mu was 400-600 kg. After that, the furrow soil between the ridge surfaces was used for covering to ensure that the spawn and the exogenous nutrient blocks were both covered with soil with a thickness of 2-5 cm.

A layout diagram after sowing is shown in Annex 3.

6. Watering:

After the soil covering, a watering operation was completed within 24 h, and the water volume was controlled to saturate the soil on the ridge surface at a depth of 15-20 cm.

7. Film mulching:

On the 2nd day after the watering, the film mulching operation was conducted. Specific operation: a white agricultural mulch film was selected according to the width of the ridge surface, and covered the ridge surface, and soil was pressed every 1-3 m on both sides of the mulch film.

8. Fungus cultivation stage:

In the fungus cultivation stage, it was ensured that soil humidity was between 23-30% and a soil temperature was 4-18° C.

9. Mushroom induction operation:

The mushroom induction operation was conducted when a ground temperature rose to 5-7° C., the mulch film was removed, and the shed was ventilated 1-3 times a day for 0.5-2 h each time. Watering was conducted 1-3 times in 1-2 days for water stimulation, and water made the surface soil at 15-25 cm soaked.

10. Fruiting management:

The primordium occurred at the low temperature of 6-8° C. After the primordia formation, the air humidity was kept at 85-95% and the soil humidity at 25-30% to avoid mechanical damage to the primordium during watering. The surface temperature was kept above 4° C., but not over 15° C. The shed was ventilated 1-2 times a day for 30 min each time at a rate of 0.05-0.2 m/s. In a small mushroom stage, the soil humidity and the air humidity were kept unchanged, the surface temperature used to be as high as 6-18° C., and ventilation was conducted 2-3 times a day for 30 min each time at a rate of 0.05-0.3 m/s to accelerate the growth of young mushrooms. In a rapid growth stage of mushrooms, the air humidity and the soil humidity were kept unchanged, the surface temperature was 8-20° C., and ventilation was conducted 2-4 times a day for 1 h each time at a rate of 0.05-0.3 m/s until the mushrooms mature.

11. Mushroom induction and management of second crop of mushrooms:

After the first crop of mushrooms were harvested, the temperature of the shed was controlled to reduce to 5-12° C., the soil humidity was adjusted to 25-30%, ventilation was reduced, and mushroom induction stimulation was conducted on the second crop of mushrooms as the mushroom induction operation described above. After the primordium occured, fruiting management was conducted as described above.

12. Harvesting:

A clean knife was used to cut the mushrooms along the flush roots. Soil or debris carried on the feet of the mushrooms was removed for later fresh sale or drying.

13. End of production:

After the production was completed, the shed was removed and the land was plowed to be used for subsequent planting of crops.

The output per unit square was 750 g.

The above descriptions are merely preferred embodiments of the present disclosure. It should be noted that those of ordinary skill in the art may further make several improvements and modifications without departing from the principle of the present disclosure, and such improvements and modifications should be deemed as falling within the protection scope of the present disclosure.

What is claimed is:

1. A cultivation method of morels, comprising the following steps:
    sowing morel spawn, applying formed exogenous nutrient blocks on the morel spawn, covering the morel spawn and the exogenous nutrient blocks with soil, watering the soil, conducting fungus cultivation at a soil humidity of 20-30% and a soil temperature of 4-18° C., performing mushroom induction and fruiting, and harvesting a first crop of mushrooms, wherein there is a gap between the exogenous nutrient blocks.

2. The cultivation method according to claim 1, wherein the exogenous nutrient block is obtained by compression forming; and the exogenous nutrient block has a particle size of 2-5 cm.

3. The cultivation method according to claim 1, wherein the exogenous nutrient block comprises the following components in parts by weight: 40-45 parts of wheat, 30-35 parts of corn cob, 20-30 parts of straw, 3-5 parts of quicklime, 1-3 parts of gypsum, and 0.3-0.8 parts of potassium dihydrogen phosphate.

4. The cultivation method according to claim 1, wherein the morel spawn is sowed at a rate of 100-250 kg/mu; a spacing between the adjacent exogenous nutrient blocks is 25-40 cm; and the exogenous nutrient blocks are applied at a rate of 400-600 kg/mu.

5. The cultivation method according to claim 1, wherein the soil for covering has a thickness of 2-5 cm.

6. The cultivation method according to claim 1, wherein after soil covering, the method further comprises watering conducted within 24 h after the soil covering; and water for the watering saturates the soil at a depth of 15-20 cm.

7. The cultivation method according to claim 1, wherein the mushroom induction is conducted in the following conditions: ventilation and watering are conducted when a ground temperature rises to 5-7° C.; the ventilation is conducted 1-3 times a day for 0.5-2 h each time; and the watering is conducted 1-3 times in 1-2 days, and water for the watering makes surface soil at 15-25 cm soaked.

8. The cultivation method according to claim 1, wherein the fruiting comprises a stage with a mushroom height of 0-1 cm, a stage with a mushroom height of 1-5 cm, and a stage with a mushroom height of 5-13 cm;

culture at the stage with the mushroom height of 0-1 cm is conducted in the following conditions: a temperature of 6-12° C., an air humidity of 85-95%, a soil humidity of 25-30%, and a surface temperature of 4-15° C.; and when the fruiting is conducted indoors, ventilation is conducted 1-2 times a day for 25-35 min each time at a rate of 0.05-0.2 m/s;

culture at the stage with the mushroom height of 1-5 cm is conducted in the following conditions: an air humidity of 85-95%, a soil humidity of 25-30%, and a surface temperature of 6-18° C.; and when the fruiting is conducted indoors, ventilation is conducted 2-3 times a day for 25-35 min each time at a rate of 0.05-0.3 m/s; and culture at the stage with the mushroom height of 5-13 cm is conducted in the following conditions: an air humidity of 85-95%, a soil humidity of 25-30%, and a surface temperature of 8-20° C.; and when the fruiting is conducted indoors, ventilation is conducted 2-4 times a day for 50-70 min each time at a rate of 0.05-0.3 m/s.

9. The method according to claim 1, wherein after the first crop of mushrooms are harvested, the method further comprises fungus cultivation, sexual multiplication induction, fruiting, and harvesting for a second crop of mushrooms;

for the second crop of mushrooms, the fungus cultivation is conducted for 7-10 days; and the secondary fungus cultivation is conducted in the following conditions: a soil humidity of 15-20%, and a soil temperature of 2-6° C.; and for the second crop of mushrooms, the mushroom induction is conducted in the following conditions: a soil temperature of 5-12° C., a soil humidity of 25-30%, and an air humidity of 85-95%.

* * * * *